(12) United States Patent
Barrios et al.

(10) Patent No.: US 10,468,760 B2
(45) Date of Patent: Nov. 5, 2019

(54) VEHICLE CONTROL SYSTEM WITH REMOTELY LOCATED RADIO FREQUENCY (RF) ASSEMBLY INCLUDING MOTION SENSOR AND RELATED METHODS

(71) Applicant: Omega Research And Development Technologies, LLC, Hauppauge, NY (US)

(72) Inventors: Hircio Javier Barrios, Miami, FL (US); Michael Stephen Thompson, Lithia Springs, GA (US)

(73) Assignee: OMEGA RESEARCH AND DEVELOPMENT TECHNOLOGIES, LLC, Hauppauge, NY (US)

( * ) Notice: Subject to any disclaimer, the term of this patent is extended or adjusted under 35 U.S.C. 154(b) by 506 days.

(21) Appl. No.: 15/347,040

(22) Filed: Nov. 9, 2016

(65) Prior Publication Data

US 2018/0131083 A1 May 10, 2018

(51) Int. Cl.
*B60W 50/14* (2012.01)
*H01Q 1/32* (2006.01)
(Continued)

(52) U.S. Cl.
CPC ....... *H01Q 1/3241* (2013.01); *B60R 25/1004* (2013.01); *B60R 25/209* (2013.01); *H01Q 1/1271* (2013.01)

(58) Field of Classification Search
CPC .... E05B 49/00; E05B 19/0082; E05B 19/046; E05B 81/88; E05B 85/01; G08G 1/00; G08G 1/0104; G08G 1/0116; G08G 1/0133; G08G 1/042; G08G 1/017; G08G 1/0962; G08G 1/09626; G08G 1/096775;
(Continued)

(56) References Cited

U.S. PATENT DOCUMENTS 5,614,885 A * 3/1997 Van Lente ................ B60R 1/04
340/12.28
6,346,877 B1 * 2/2002 Flick .................... B60R 25/1001
307/10.2
(Continued)

OTHER PUBLICATIONS

Prestige Model APS-787E Installation Manual Vehicle Security and Remote Start System: 2015 Voxx Electrronics www.voxxelectronics. com/docs/common/APS787E/APS787E_IM.pdf. pp. 32.

*Primary Examiner* — Daniel Previl
(74) *Attorney, Agent, or Firm* — Allen, Dyer, Doppelt + Gilchrist, P.A.

(57) ABSTRACT

A vehicle control system for a vehicle may include a radio frequency (RF) assembly including an RF assembly housing to be positioned within the vehicle, an antenna carried by the RF assembly housing, an RF receiver carried by the RF assembly housing, and a motion sensor carried by the RF assembly housing. The system may further include a controller assembly including a controller assembly housing to be positioned within the vehicle spaced apart from the RF assembly, and a controller carried by the controller housing. The controller may perform at least one first operation responsive to RF signals received by the RF receiver from a remote transmitter, and perform at least one second operation responsive to the motion sensor.

26 Claims, 6 Drawing Sheets

(51) Int. Cl.
*B60R 25/10* (2013.01)
*B60R 25/20* (2013.01)
*H01Q 1/12* (2006.01)

(58) Field of Classification Search
CPC ....... G08G 1/096827; G08G 1/096838; G08G 1/16; G08G 1/20; H04B 7/26; H04B 1/38; H04B 5/0037; Y02D 70/142; Y02D 70/144; Y02D 70/162; Y02D 70/449; B60R 16/023; B60R 25/24; B60R 2325/304; B60R 25/1004; B60R 25/102; B60R 2325/205; B60R 25/02; B60R 25/042; B60R 25/08; B60R 25/33; B60R 25/04; B60R 25/209; B60R 25/045; B60R 11/04; B60R 1/00; B60R 2011/0003; B60R 2011/004; B60R 2021/01184; B60R 2021/01327; B60R 2025/1013; B60R 2025/1016; B60R 21/0132; B60R 2300/30; B60R 2300/804; B60R 2325/105; B60R 25/10; B60R 25/1003; B60R 25/104; B60R 25/2054; B60R 25/2081; B60R 25/241; G01S 13/878; G01S 19/04; G01S 19/14; G01S 19/41; G01S 19/44; G01S 19/53; G01S 19/55; G01S 2013/936; G06K 17/00; G06K 19/0717; G06K 19/0718; G06K 19/0723; G06K 19/07762; G06K 7/0008; G06K 7/10079; G06K 7/10415; G06K 19/0708; G06K 7/10257; G06K 7/10316; G06K 7/10425; G06K 9/00087; G06K 9/00288; G06K 9/00832; G06K 9/00845; G06K 9/00885; G06Q 20/3278; G06Q 10/00; G06Q 10/20; G06Q 20/105; G06Q 20/108; G06Q 20/14; G06Q 20/32; G06Q 20/3224; G06Q 20/401; G06Q 20/4012; G06Q 20/405; G06Q 30/012; G06Q 30/0206; G06Q 30/0208; G06Q 30/0601; G06Q 30/0613; G06Q 30/0625; G06Q 30/0635; G07C 2009/00317; G07C 9/00111; G07C 9/00309; G07C 2009/0038; G07C 2009/00587; G07C 2009/00793; G07C 2009/0096; G07C 2209/63; G07C 5/008; G07C 5/02; G07C 5/0808; G07C 5/0816; G07C 5/0858; G07C 9/00174; G07C 9/00563; H01Q 1/2208; H01Q 1/2216; H01Q 3/247; H01Q 7/00; H01Q 1/1271; H01Q 1/3241; H01Q 1/3233; H01Q 1/325; H01Q 1/3266; H01Q 1/3275; H01Q 1/3283; H01Q 1/3291; H01Q 1/38; H01Q 21/30; H04W 12/08; H04W 12/06; H04W 12/00508; H04W 12/02; H04W 12/04; H04W 4/046; H04W 4/40; H04W 4/44; H04W 4/46; H04W 4/80; H04W 64/006; H04W 72/0413; H05K 3/4611; H05K 5/0247; Y10T 29/49004; Y10T 70/7062; B60T 7/18; B60T 8/4266; B60T 8/4863; B60W 2550/402; B60W 50/029; B60W 2040/0809; B60W 2050/143; B60W 2050/146; B60W 2300/34; B60W 2540/00; B60W 2540/02; B60W 2540/04; B60W 40/08; B60W 50/08; F02D 41/021; F02D 41/042; B60Q 1/44; B60Q 1/2673; B60Q 1/2676; B60Q 2900/30; Y02T 10/7005; Y02T 10/7072; Y02T 10/7083; Y02T 10/7291; Y02T 90/121; Y02T 90/122; Y02T 90/124; Y02T 90/128; Y02T 90/14; Y02T 90/16; Y02T 90/161; Y02T 90/163; Y02T 90/169; A63F 13/211; A63F 13/235; A63F 13/24; A63F 13/79; A63F 2300/1043; A63F 9/24; B60L 2240/549; B60L 2240/70; B60L 2240/72; B60L 2270/32; B60L 53/12; B60L 53/14; B60L 53/65; B60L 53/665; B60L 53/80; B60L 5/24; B60L 7/10; B60L 8/003; B60L 8/006; B60L 9/00; B62B 2203/07; B62B 2203/10; B62B 5/0026; B62B 5/0076; B62B 5/02; B62J 2006/008; B62J 6/00; B66F 13/005; B66F 9/12; B66F 9/19; H04L 2209/805; H04L 2209/84; H04L 27/362; H04L 63/0428; H04L 9/321; H04L 9/3226; H04N 21/441; Y10S 414/134; A01B 69/004; A01B 69/007; A01B 79/005; A61B 2503/22; A61B 5/1171; A61B 5/1172; A61B 5/1176; B60C 23/0408; B60C 23/0433; B60K 2370/1537; B60K 2370/334; B60K 35/00; B60K 6/20; B60M 1/00; B60M 7/00; B60Y 2200/91; B60Y 2200/912; B60Y 2200/92; B60Y 2300/60; B60Y 2302/07; B60Y 2400/92; E05F 15/77; E05Y 2900/546; G01C 21/36; G01C 21/3617; G01C 21/3697; G01C 22/006; G05B 15/02; G05D 1/0011; G05D 1/0088; G05D 1/027; G05D 1/0274; G05D 1/0278; G05D 2201/0202; G06F 16/248; G06F 16/951; G06F 21/31; G06F 21/32; G06F 21/6245; G06F 3/011; G07B 15/063; G08B 13/00; H02J 7/0068; Y04S 30/14

USPC ........... 340/425.5, 426, 825.31, 541, 825.32, 340/825.69, 572.1–572.8

See application file for complete search history.

(56) References Cited

U.S. PATENT DOCUMENTS

| 6,661,386 | B1* | 12/2003 | Petros | H01Q 1/1285 333/24 C |
| 7,557,715 | B1* | 7/2009 | Noakes | G06K 19/07381 340/572.1 |
| 8,031,125 | B2* | 10/2011 | Rabinovich | H01Q 1/3241 343/712 |
| 9,238,449 | B2 | 1/2016 | Flick | |
| 2015/0178532 | A1* | 6/2015 | Brule | G06K 19/0717 340/5.61 |
| 2016/0342883 | A1* | 11/2016 | Huhtasalo | G06K 19/07767 |

\* cited by examiner

VEHICLE CONTROL SYSTEM WITH REMOTELY LOCATED RADIO FREQUENCY (RF) ASSEMBLY INCLUDING MOTION SENSOR AND RELATED METHODS

TECHNICAL FIELD

This disclosure relates to vehicle control systems, such as vehicle security and remote start systems and related methods.

BACKGROUND

Vehicle security systems are commonly used to protect against vehicle theft, as well as damage to the vehicle or theft of property from within the vehicle. Traditional vehicle security systems may provide for audible/visual alerts, disabling of the vehicle, and/or other operations upon the detection of a threat. Other vehicle functions are sometimes incorporated within a vehicle security system, or as a stand alone system. One such function is remote keyless entry (RKE), which allows a user to unlock one or more vehicle doors from a wireless transmitter (e.g., a key fob), for example. Another function is remote starting, which allows a vehicle engine to be remotely started in a similar manner.

Various approaches have been used to extend the range of wireless transmitters for vehicle security, RKE, and/or remote start systems, such as deploying separate antennas which may be remotely mounted with respect to a main security or remote start system control module. One such configuration is set forth in U.S. Pat. No. 8,031,125 to Rabinovich et al., which is directed to an antenna and splitter for receiving radio a remote keyless entry signals. The antenna system includes a first antenna having a helical shaped portion, and configured to receive signals over a first frequency range. A second antenna is positioned in proximate distance from the first antenna, and is configured to receive signals over a second frequency range. A splitter is be configured for separating signals received from radio and remote keyless entry antennas and may include a first branch including a first filter to filter AM band signals from communications signals received from an antenna, a second branch including a second filter to filter FM band signals from communications signals received from the antenna, a third branch including a third filter to filter remote keyless entry signals from communications signals received from the antenna, and an amplifier to amplify the remote keyless entry signals. The antenna may be a whip antenna or roof antenna.

The assignee of the present invention offers vehicle security and remote start systems, such as, for example, the Prestige Model APS-787E, that has improved user range due to its mounting of the antenna adjacent the windshield area of the vehicle. The main control unit of the system is positioned beneath the dashboard area, and a shock sensor may be coupled via a short wiring harness, to the main control unit. Accordingly, the shock sensor is thus typically positioned beneath the dashboard, and may be subject to unintentional triggering due to improper mounting or positioning, for example.

SUMMARY

A vehicle control system may include a radio frequency (RF) assembly including an RF assembly housing to be positioned in a vehicle, an antenna carried by the RF assembly housing, an RF receiver carried by the RF assembly housing, and a motion sensor carried by the RF assembly housing. The RF receiver may be coupled to the antenna and be responsive to a remote transmitter. The system may further include a controller assembly including a controller assembly housing to be positioned within the vehicle remotely from the RF assembly, and a controller carried by the controller assembly housing. The controller may be configured to perform at least one first operation responsive to RF signals received by the RF receiver from the remote transmitter, and perform at least one second operation responsive to movement detection by the movement sensor. Accordingly, a longer range of RF remote control may be provided, while also providing a more convenient, less expensive, and more robust positioning of a movement sensor in the vehicle.

More particularly, the RF assembly may comprise a printed circuit board (PCB) carried by the RF assembly housing, and the RF receiver may comprise RF receiver circuitry carried by the PCB. The movement sensor may comprise a Micro-Electro Mechanical System (MEMS) accelerometer carried by the PCB, for example.

The RF assembly may further comprise a control switch carried by the RF assembly housing, such as a valet switch. The controller may be responsive to the control switch. The RF assembly may further comprise an adhesive layer to couple the RF assembly housing to the front windshield of the vehicle.

The at least one second operation may comprise a pre-warn indication based upon the movement sensor detecting motion above a first threshold. The at least one second operation may further comprise a full alarm indication based upon the movement sensor detecting motion above a second threshold greater than the first threshold.

The at least one second operation may additionally comprise a remote start shutdown. In other words, the movement sensor may be used for a manual transmission remote start system, to quickly shut down the remote start sequence, such as when the vehicle is started in gear.

The at least one first operation may comprise at least one of a security operation, a remote keyless entry operation, and a remote start operation. Of course, these operations are typically controlled by a remote handheld transmitter carried by the user when away from the vehicle, for example.

A method aspect is for vehicle control of a vehicle comprising a front windshield area. The method may include operating a radio frequency (RF) assembly comprising an RF assembly housing positioned in the vehicle; an antenna carried by the RF assembly housing; an RF receiver carried by the RF assembly housing, coupled to the antenna, and responsive to a remote transmitter; and a sensor carried by the RF assembly housing. The method may also include operating a controller assembly comprising a controller assembly housing positioned within the vehicle spaced apart from the RF assembly, and a controller carried by the controller assembly housing. More particularly, the controller may be operated to perform at least one first operation responsive to RF signals received by the RF receiver from the remote transmitter, and perform at least one second operation responsive to the motion sensor.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Referring initially to FIGS. 1-4, a vehicle control system 30 is provided for a vehicle 31 including a front windshield area 32. The vehicle control system 30 includes a radio frequency (RF) assembly 33 illustratively including an RF assembly housing 34 positioned adjacent the front windshield area 32, an antenna 35 carried by the RF assembly housing, an RF receiver 36 carried by the RF assembly housing, and a sensor 37 carried by the RF assembly housing. More particularly, in the illustrated embodiment, the RF receiver 36 comprises RF receiver circuitry carried by the Printed Circuit Board (PCB) 38. The motion sensor 37 may be in the form of a Micro-Electro Mechanical system (MEMS) accelerometer also carried by the PCB 38, although other types of motion or shock sensors may also be used to detect lateral and/or reciprocating motion, as will be appreciated by those skilled in the art. It should be noted that the RF assembly housing 34 may be positioned elsewhere within the vehicle besides the front windshield area 32 in some embodiments.

Figure 1:
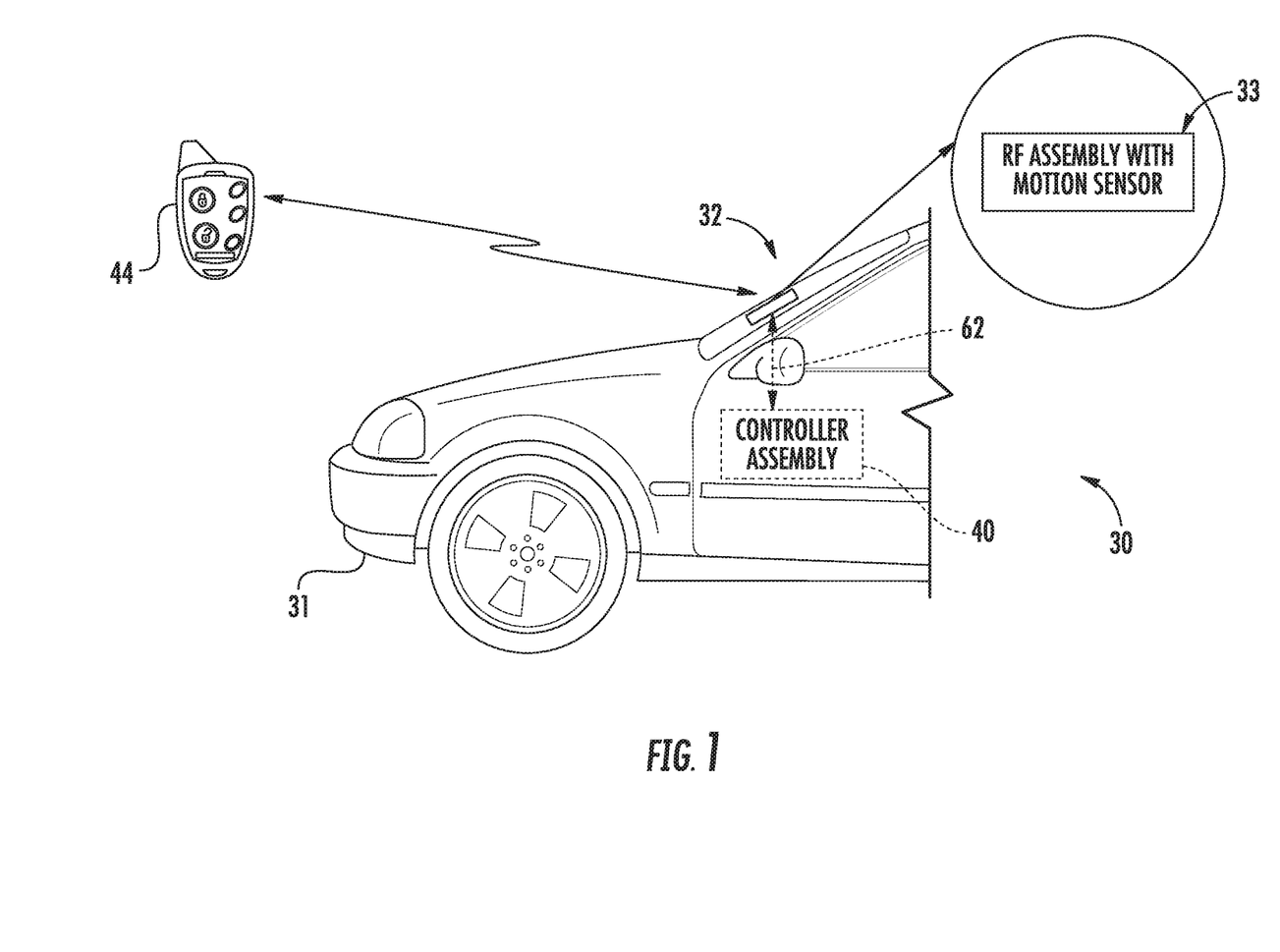
FIG. 1 is a schematic diagram of a vehicle portion including a vehicle control system in accordance with an example embodiment.
Figure 2:
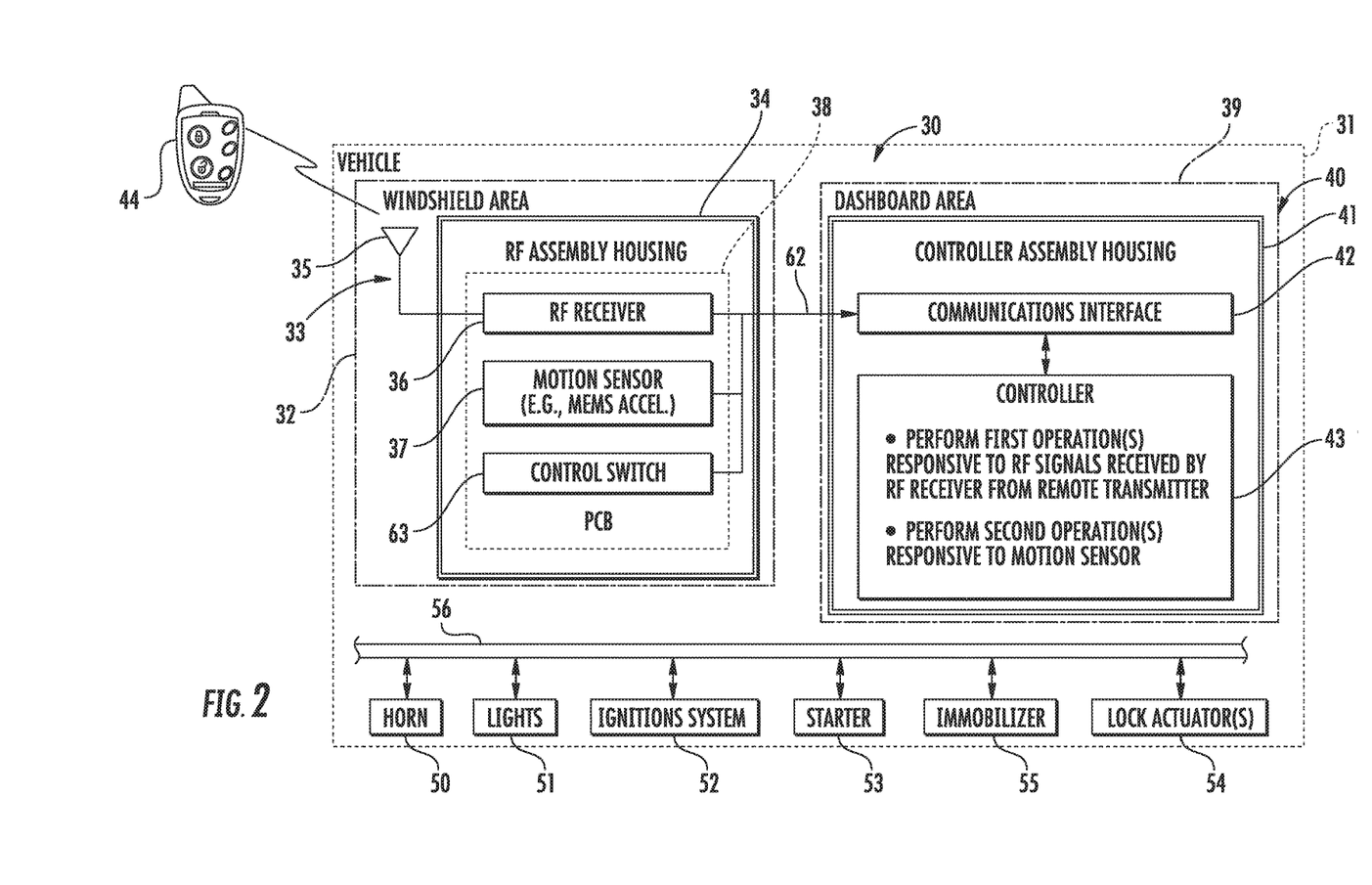
FIG. 2 is a schematic block diagram of an example implementation of the system of FIG. 1 in greater detail.

The system 30 further illustratively includes a controller assembly 40 including a controller assembly housing 41 positioned within the vehicle 31 spaced apart from the RF assembly 33 (e.g., under the dashboard), and a controller 43 also carried by the controller assembly housing. A communications interface 42 may also carried by the controller assembly housing 41 and configured to facilitate communication between with the RF receiver 36 and the sensor 47, and the controller 43, via the cable 62.

The RF assembly housing 34 advantageously provides an "outboard" module for the antenna 35 and receiver 36, which is separate and remotely located from the controller assembly 40, to receive signals from a remote wireless transmitter 44 to control the system 30. In the illustrated example, the remote transmitter 44 is a fob which may be carried by a user on a keychain, etc., when away from the vehicle 31. However, in other embodiments, different transmitters may be used, such as mobile wireless communications devices (smart phones, tablet computers, etc.) to control the system 30 via Bluetooth or WiFi communications, for example. Of course, in other embodiments the remote transmitter may be a central or monitoring station as will be appreciated by those skilled in the art.

Not only does a remotely located RF assembly 30 provide for enhanced RF reception when located higher up in the vehicle 31 (e.g., in the front windshield area 32), incorporating the motion sensor 37 within the RF assembly housing 34 advantageously further provides a more rigid mounting location and more consistent placement than with typical shock or motion sensors located adjacent to an alarm system or remote start controller under the dashboard area 39 of the vehicle. This, in turn, may provide for easier installation, enhanced reliability, and less "false positive" detections by the motion sensor 37.

In the example of FIG. 2, the vehicle 31 illustratively includes various vehicle devices such as a horn 50, vehicle lights 51 (e.g., headlights, brake lights, and/or parking lights), an ignition system 52, a starter 53, and door lock actuators 54, and an immobilizer 55. The controller 43 may communicate with such devices via connections 56 which may be in the form of direct wiring or via one or more vehicle communications busses, as will be appreciated by those skilled in the art. Moreover, the controller 43 may also communicate with other vehicle devices (e.g., siren, cellular transceiver, climate control system, etc.) to perform additional security and/or vehicle operations in addition to those described below.

Figure 3:
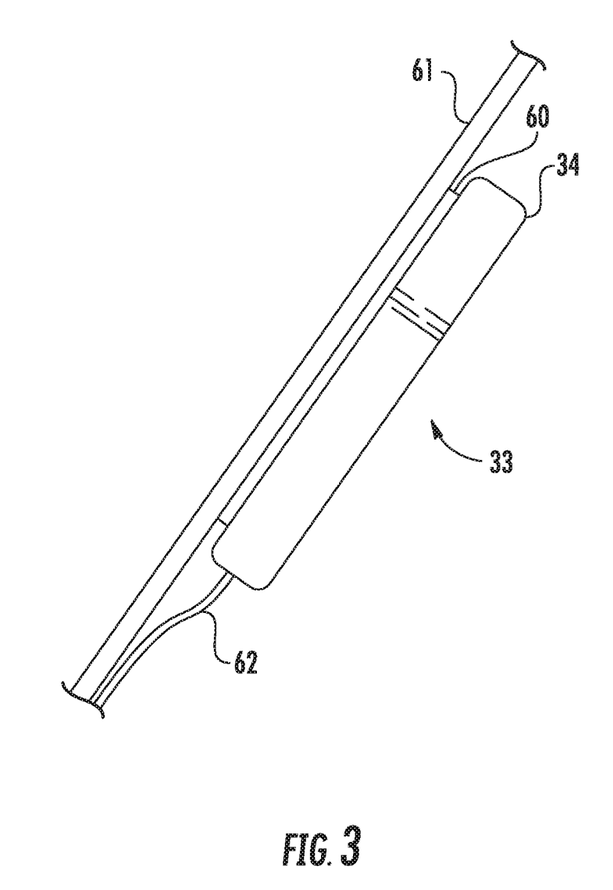
FIG. 3 is a side view of an example RF frequency assembly of the system of FIGS. 1 and 2 mounted on a vehicle windshield.

In the example illustrated in FIG. 3, the RF assembly 33 further includes an adhesive layer 60 which couples the RF assembly housing 34 to the inside of the front windshield 61 of the vehicle 31. One or more wires or cable 62 may be used to connect the RF assembly housing 34 with the controller assembly housing 41 via a communications interface 42 (which may be a port for the wiring harness plug, for example). The cable 62 may not only be used for carrying communication signals between the controller assembly 40 and the RF assembly 33, but also to provide power to the RF assembly in some embodiments. However, it should be noted that a separate wire may be used to connect the RF assembly 33 to the vehicle power system directly, or in some embodiments the RF assembly may be battery powered and communicate wirelessly with the communications interface 42. In such configurations, the communications interface 42 would be a wireless communications device(s) and the RF assembly housing 34 would further include corresponding interface circuitry to communicate information to the communications interface. In some embodiments, a fiber-optic cable may be used between the controller assembly 40 and the RF assembly 33.

Figure 4:
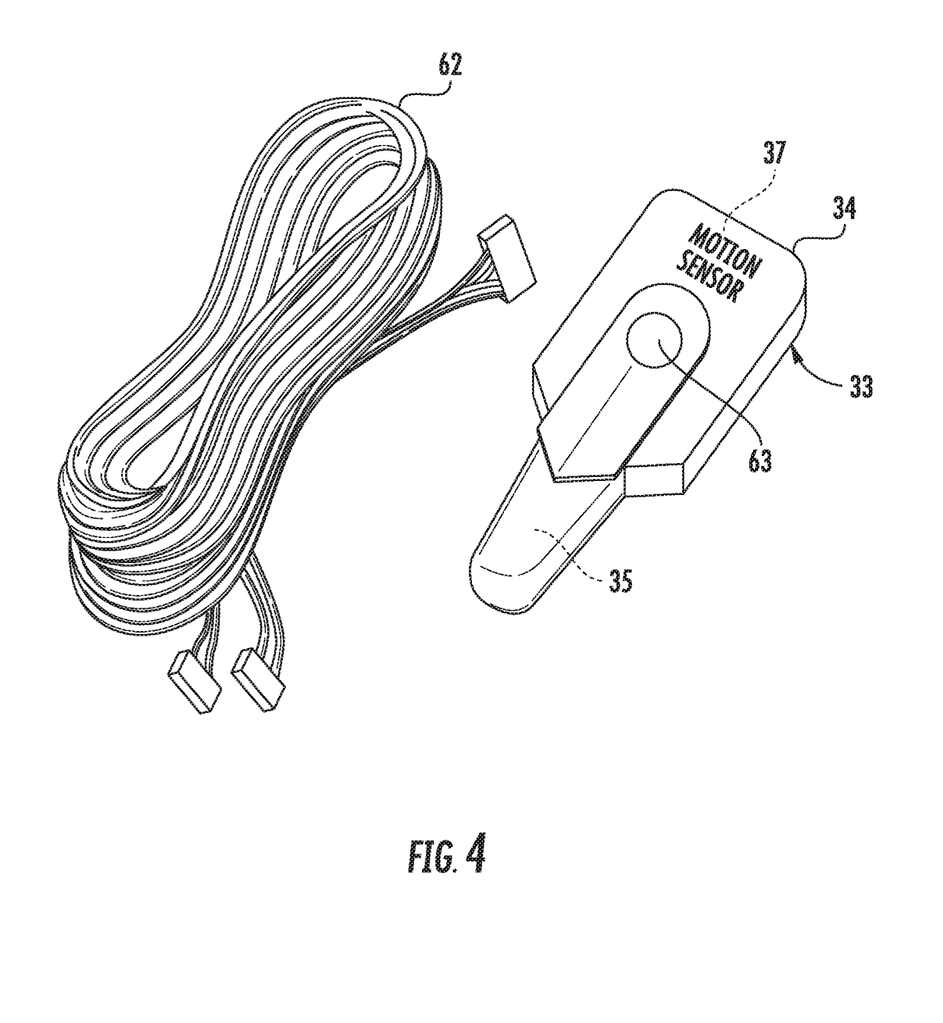
FIG. 4 is a perspective view of an example RF frequency assembly and associated wiring harness which may be used with the system of FIGS. 1 and 2.

The RF assembly 33 further illustratively includes an optional control switch (here a button 63) carried by the RF housing 34, and the controller 43 may be responsive to the control switch, such as to enter a valet mode or a learning mode, for example. In some embodiments, the RF assembly 34 may further include a status light(s) (not shown) to indicate whether the RF assembly has power, is in an armed/disarmed/programming mode, etc.

Figure 5:
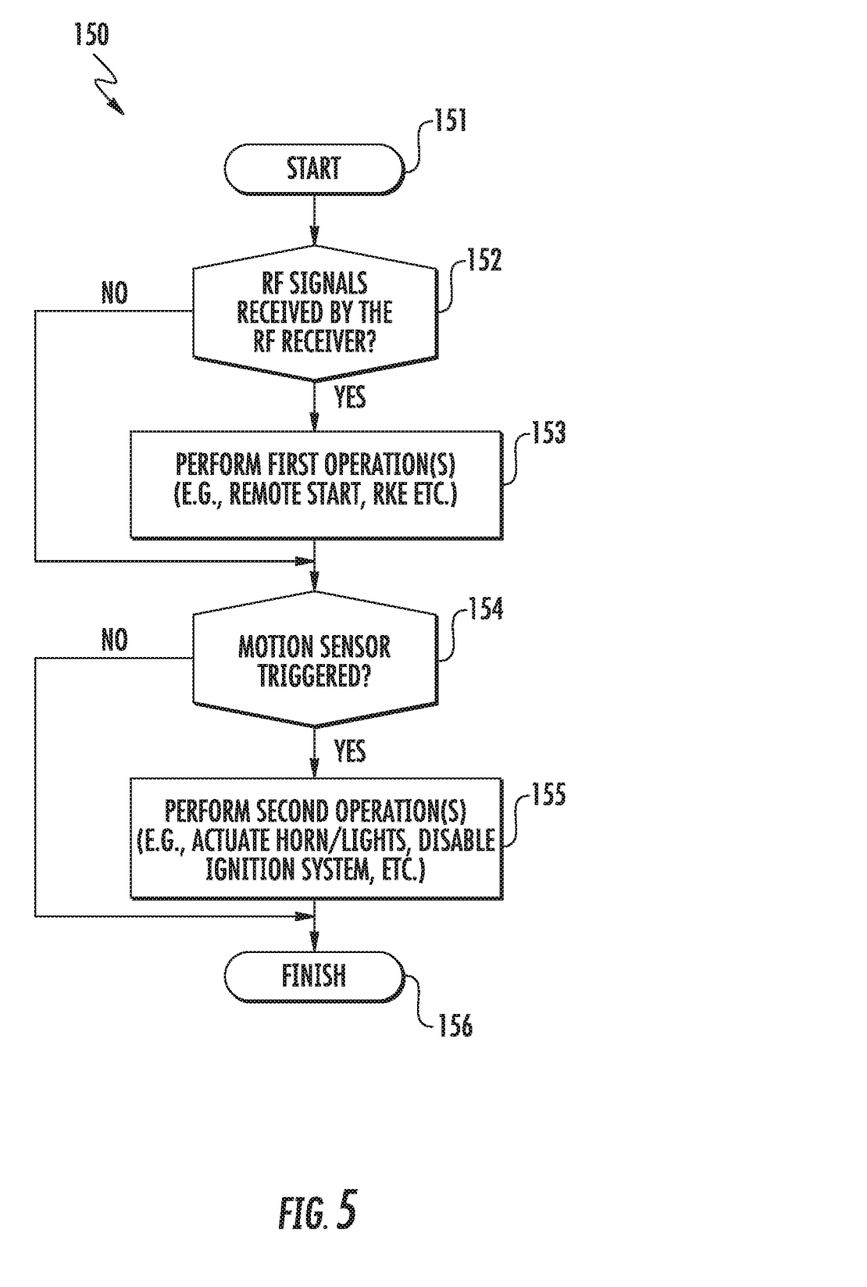
FIGS. 5 and 6 are flow diagrams illustrating example method aspects associated FIG. 1 or 2.

Referring additionally to the flow diagram 150 of FIG. 5, operation of the system 30 to perform various security and vehicle operations responsive to the RF assembly 33 are now described. Beginning at Block 151, the controller 43 may be configured to perform one or more first operations responsive to RF signals received by the RF receiver 36 from the wireless transmitter 44, at Blocks 152-153. For example, the first operations may include remote keyless entry (RKE) of one or more vehicle door lock actuators 54, as well as operation of the starter 53 while bypassing the immobilizer 55 to perform a remote start operation. Other vehicle operations (e.g., opening/closing a trunk or rear hatchback door, etc.) may also be performed by the controller 43 responsive to wireless signals from the transmitter 44 as well, in addition to security operations (e.g., switching between armed and disarmed modes, and/or sounding the horn 50 and/or flashing the lights 52 responsive to a panic signal, etc.).

Moreover, the controller 43 is also configured to perform one or more second operations responsive to motion sensor triggering at Blocks 154-155, which illustratively concludes the method of FIG. 5 (Block 156). Generally speaking, movement detection or shock detection by the motion sensor 37 when the vehicle 31 is parked and the controller 43 is in an armed mode is an indicator that the vehicle 31 is being broken into or damaged, and thus warranting the security operation(s).

Figure 6:
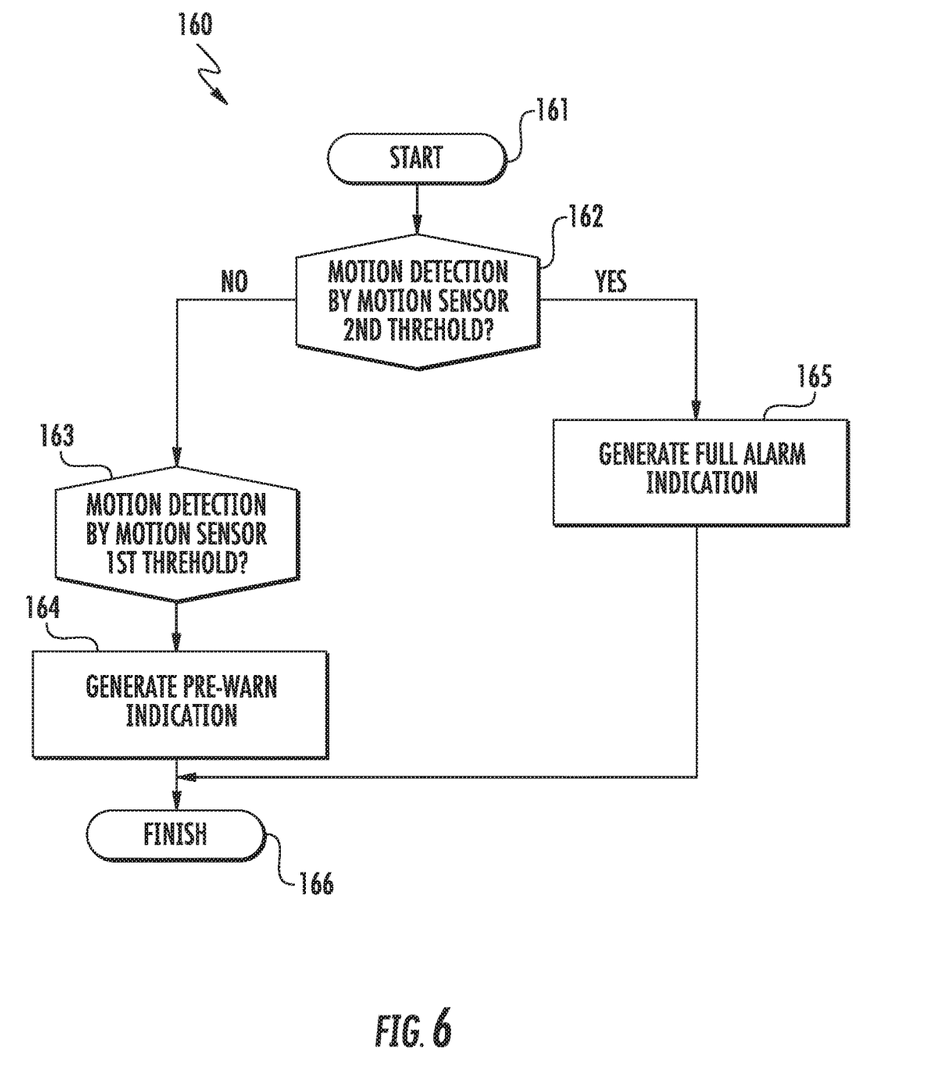

In one example configuration now described with reference to the flow diagram 160 of FIG. 6, different security operations may be performed based upon the magnitude or severity of the detected movement. More particularly, the controller 43 may cooperate with the motion sensor 37 to determine if detected shock exceeds a first (lower) threshold as well as a second (higher) threshold, at Blocks 162, 163. The lower threshold may be set so that it is not too low thereby avoid false positives, yet being sufficiently low enough to register when someone leans or otherwise has incidental contact with the vehicle 31. In this case, a pre-warn indication may be generated, at Block 164, which may include one or more "chirps" of the horn 50 and/or one or more flashes of the lights 51, for example. On the other hand, when the second (higher) threshold is exceeded, this may indicate that the vehicle 31 is being broken into or damaged, at which point the full alarm indication is appropriate. The full alarm indication may include a louder and/or repeated sounding the horn 50 and/or brighter/repeated flashing the lights 51, for example. The method of FIG. 6 illustratively concludes at Block 166.

By way of example, the motion sensor 37 may be a 3D or tri-axis accelerometer in some embodiments. One particular advantage of the motion sensor 37 is to detect vehicle motion during a remote start operation. More particularly, for vehicles with manual transmissions, if the vehicle is left in gear then it will lurch forward when started without the user's foot on the brake pedal. The system 30 may advantageously determine if the vehicle 31 was left in gear (in the case of a manual transmission) based upon a detection of movement immediately after initiation of the remote start sequence, and the controller 43 may accordingly cause the ignition system 52 and/or starter 53 to shut down the remote start sequence (or shut off the vehicle 31 if already started) before the vehicle lurches too far. Additionally, a tri-axis accelerometer may also be used to detect tilt, which may occur when a thief attempts to steal a wheel and/or tire, another condition for which an alarm indication is appropriate.

A method aspect is directed to vehicle control of a vehicle 31 comprising a front windshield area 32. The method may comprise operating a radio frequency (RF) assembly 33 comprising an RF assembly housing 34 positioned adjacent the front windshield area 32; an antenna 35 carried by the RF assembly housing; an RF receiver 36 carried by the RF assembly housing, coupled to the antenna, and responsive to a remote transmitter 44; and a motion sensor 37 carried by the RF assembly housing. The method may also include operating a controller assembly 40 comprising a controller assembly housing 41 positioned within the vehicle spaced apart from the RF assembly 33, and a controller 43 carried by the controller assembly housing to perform at least one first operation responsive to RF signals received by the RF receiver 36 from the remote transmitter 44, and perform at least one second operation responsive to the motion sensor 37.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A vehicle control system for a vehicle comprising:
   a radio frequency (RF) assembly comprising
      an RF assembly housing to be positioned within the vehicle,
      an antenna carried by the RF assembly housing,
      an RF receiver carried by the RF assembly housing, coupled to the antenna, and responsive to a remote transmitter, and
      a motion sensor carried by the RF assembly housing; and
   a controller assembly comprising
      a controller assembly housing to be positioned within the vehicle spaced apart from the RF assembly, and
      a controller carried by the controller assembly housing and configured to
         perform at least one first operation responsive to RF signals received by the RF receiver from the remote transmitter, and
         perform at least one second operation responsive to the motion sensor.

2. The vehicle control system of claim 1 wherein the RF assembly comprises a printed circuit board (PCB) carried by the RF assembly housing; and wherein the RF receiver comprises RF receiver circuitry carried by the PCB.

3. The vehicle control system of claim 2 wherein the motion sensor comprises a Micro-Electro Mechanical System (MEMS) accelerometer carried by the PCB.

4. The vehicle control system of claim 1 wherein the RF assembly further comprises a control switch carried by the RF assembly housing; and wherein the controller is responsive to the control switch.

5. The vehicle control system of claim 1 further comprising a cable extending between the RF assembly and the controller assembly.

6. The vehicle control system of claim 1 wherein the RF assembly further comprises an adhesive layer to couple the RF assembly housing to a front windshield of the vehicle.

7. The vehicle control system of claim 1 wherein the at least one second operation comprises a pre-warn indication based upon the motion sensor detecting motion above a first threshold.

8. The vehicle control system of claim 7 wherein the at least one second operation further comprises a full alarm indication based upon the motion sensor detecting motion above a second threshold greater than the first threshold.

9. The vehicle control system of claim 1 wherein the at least one second operation comprises a remote start shutdown.

10. The vehicle control system of claim 1 wherein the at least one first operation comprises at least one of a security operation, a remote keyless entry operation, and a remote start operation.

11. A vehicle control system for a vehicle comprising a front windshield area, the vehicle control system comprising:
   a radio frequency (RF) assembly comprising
      an RF assembly housing to be positioned adjacent the front windshield area,
      an antenna carried by the RF assembly housing, a printed circuit board (PCB) carried by the RF assembly housing, RF receiver circuitry carried by the PCB, coupled to the antenna, and responsive to a remote transmitter, and a motion sensor carried by the PCB;

a controller assembly comprising a controller assembly housing to be positioned within the vehicle spaced apart from the RF assembly, and a controller carried by the controller assembly housing and configured to perform at least one first operation responsive to RF signals received by the RF receiver circuitry from the remote transmitter, and perform at least one second operation responsive to the motion sensor; and a cable extending between the RF assembly and the controller assembly.

12. The vehicle control system of claim 11 wherein the motion sensor comprises a Micro-Electro Mechanical System (MEMS) accelerometer carried by the PCB.

13. The vehicle control system of claim 11 wherein the RF assembly further comprises a control switch carried by the RF housing; and wherein the controller is responsive to the control switch.

14. The vehicle control system of claim 11 wherein the RF assembly further comprises an adhesive layer to couple the RF assembly housing to the front windshield of the vehicle.

15. The vehicle control system of claim 11 wherein the at least one second operation comprises a pre-warn indication based upon the motion sensor detecting motion above a first threshold.

16. The vehicle control system of claim 15 wherein the at least one second operation further comprises a full alarm indication based upon the motion sensor detecting motion above a second threshold greater than the first threshold.

17. The vehicle control system of claim 11 wherein the at least one second operation comprises a remote start shutdown.

18. The vehicle control system of claim 11 wherein the at least one first operation comprises at least one of a security operation, a remote keyless entry operation, and a remote start operation.

19. A method for vehicle control of a vehicle comprising:
operating a radio frequency (RF) assembly comprising an RF assembly housing positioned within the vehicle; an antenna carried by the RF assembly housing; an RF receiver carried by the RF assembly housing, coupled to the antenna, and responsive to a remote transmitter; and a motion sensor carried by the RF assembly housing; and operating a controller assembly comprising a controller assembly housing positioned within the vehicle spaced apart from the RF assembly, and a controller carried by the controller assembly housing to perform at least one first operation responsive to RF signals received by the RF receiver from the remote transmitter, and perform at least one second operation responsive to the motion sensor.

20. The method of claim 19 wherein the RF assembly comprises a printed circuit board (PCB) carried by the RF assembly housing; and wherein the RF receiver comprises RF receiver circuitry carried by the PCB.

21. The method of claim 20 wherein the RF assembly further comprises a control switch carried by the RF assembly housing; and further comprising operating the controller responsive to the control switch.

22. The method of claim 19 wherein the motion sensor comprises a Micro-Electro Mechanical System (MEMS) accelerometer carried by the PCB.

23. The method of claim 19 wherein the at least one second operation comprises a pre-warn indication based upon the motion sensor detecting motion above a first threshold.

24. The method of claim 23 wherein the at least one second operation further comprises a full alarm indication based upon the motion sensor detecting motion above a second threshold greater than the first threshold.

25. The method of claim 19 wherein the at least one second operation comprises a remote start shutdown.

26. The method of claim 19 wherein the at least one first operation comprises at least one of a security operation, a remote keyless entry operation, and a remote start operation.

* * * * *